United States Patent [19]

Higuchi et al.

[11] Patent Number: 4,831,182
[45] Date of Patent: May 16, 1989

[54] BIPHENYL-BASED DIESTER COMPOUNDS AND LIQUID CRYSTAL COMPOSITIONS CONTAINING SAME

[75] Inventors: Ryoichi Higuchi, Tokyo; Takao Sakurai, Kawasaki; Naoko Mikami, Yokohama; Kiriko Akaiwa, Tokyo; Koji Takeuchi, Yokohama, all of Japan

[73] Assignee: Ajinomoto Co., Inc., Tokyo, Japan

[21] Appl. No.: 41,428

[22] Filed: Apr. 23, 1987

Related U.S. Application Data

[62] Division of Ser. No. 774,484, Sep. 10, 1985, Pat. No. 4,695,651.

[30] Foreign Application Priority Data

Sep. 10, 1984 [JP] Japan ................. 59/189232
Feb. 8, 1985 [JP] Japan ................. 60/22920

[51] Int. Cl.[4] ............... C07C 69/76; C09K 19/12; C09K 19/52; G02F 1/13
[52] U.S. Cl. ............... 560/59; 252/299.01; 252/299.66; 350/350.5
[58] Field of Search ............... 252/299.01, 299.66; 350/350.5; 560/59

[56] References Cited

U.S. PATENT DOCUMENTS

| | | | |
|---|---|---|---|
| 3,947,375 | 3/1976 | Gray et al. | 252/299.66 |
| 4,576,732 | 3/1986 | Isogai et al. | 252/299.66 |
| 4,592,858 | 6/1986 | Higuchi et al. | 252/299.66 |
| 4,596,667 | 6/1986 | Inukai et al. | 252/299.66 |
| 4,613,209 | 9/1986 | Goodby et al. | 252/299.66 |
| 4,614,609 | 9/1986 | Inoue et al. | 252/299.66 |

FOREIGN PATENT DOCUMENTS

| | | | |
|---|---|---|---|
| 164814 | 12/1985 | European Pat. Off. | 252/299.66 |
| 191600 | 8/1986 | European Pat. Off. | 252/299.65 |
| 58-46040 | 3/1983 | Japan | 252/299.66 |
| 62-72652 | 4/1987 | Japan | 252/299.66 |

OTHER PUBLICATIONS

Surendranath et al., Mol. Cryst. Liq. Cryst., vol. 131, pp. 1–7 (Oct. 1985).
Goodby et al., Liquid Crystals & Ordered Fluids, vol. 1, pp. 1–32 (1984).

*Primary Examiner*—John F. Terapane
*Assistant Examiner*—J. E. Thomas, Jr.
*Attorney, Agent, or Firm*—Oblon, Fisher, Spivak, McClelland & Maier

[57] ABSTRACT

A liquid crystal compound of the formula:

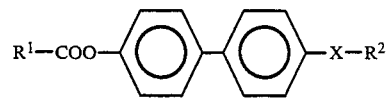

wherein $R^1$ and $R^2$ represent $C_{1-18}$ alkyl group, alkyl halide group or aralkyl halide, $R^1$ may be the same as or different from $R^2$, X is selected from $-COOCH_2-$ or $-OCO-$.

5 Claims, 4 Drawing Sheets

FIG. 1 THE INFRARED ABSORPTION SPECTRUM OF (S)-3-METHYL-2-CHLOROBUTYL 4-(4'-OCTYLCARBONYLOXY)BIPHENYLCARBOXYLATE OBTAINED IN EXAMPLE I

THE DIELECTRIC CONSTANT VERSUS TEMPERATURE RELATIONSHIP FOR (S)-3-METHYL-2-CHLOROBUTYL 4-(4'-OCTYLCARBONYLOXY)BIPHENYL-CARBOXYLATE OF THIS INVENTION AND 2-METHYLBUTYL (4-n-DECYCLOXY-BENZYLIDENEAMINO)CINNAMATE

FIG. 2

FIG. 3 THE INFRARED ABSORPTION SPECTRUM OF (S,S)-1-CHLORO-2-METHYLBUTYLCARBONYLOXYBENZOIC ACID-4'-(4''-HEPTYLCARBONYLOXYPHENYL)-PHENYL ESTER OBTAINED IN EXAMPLE I

THE DIELECTRIC CONSTANT VERSUS TEMPERATURE RELATIONSHIP FOR
(S,S)-1-CHLORO-2-METHYLBUTYLCARBONYLOXYBENZOIC ACID-4'-(4"-
HEPTYLCARBONYLOXYPHENYL)-PHENYL ESTER

*FIG. 4*

BIPHENYL-BASED DIESTER COMPOUNDS AND LIQUID CRYSTAL COMPOSITIONS CONTAINING SAME

This is a division of application Ser. No. 06/774,484, filed Sept. 10, 1985, U.S. Pat. No. 4,695,651.

BACKGROUND OF THE INVENTION

(1) Field of the Invention

This invention relates to new liquid-crystal compounds and to liquid crystal compositions containing the same, particularly smectic liquid crystal compositions.

The liquid-crystal compounds herein include those compounds which are useful as a component of liquid crystal compositions even though they do not exist in the form of liquid crystal.

(2) Description of the Related Art

Twisted nematic (TN) and dynamic scatter (DS) types, both employing nematic liquid crystal cells, are the modes of liquid-crystal display most extensively used at present. One disadvantage of conventional nematic liquid crystal cells is low response speeds (on the order of milliseconds at the highest), which limit the use of this type of liquid crystal cells.

It has recently been found that higher response speeds can be achieved by smectic liquid crystal cells and that some of optically active smectic compounds are ferroelectric tric. The ferroelectric liquid crystals are a group of compounds which are ferroelectric when they exist as chiral smectic C (hereinafeter abbreviated as "SmC*") phase and are typified by 2-methylbutyl 4-(4-n-decyloxybenzylideneamino)cinnamate (hereinafter abbreviated as "DOBAMBC") of the following structural formula [J. Physique, 39, L-69(1975)], (DOBAMBC)

More recently N. A. Clark et al. [Appl. Phys. Lett., 36, 89(1980)] found that very high response speeds on the order of microseconds can be achieved by thin-film DOBAMBC cells. Since then ferroelectric liquid crystals have been receiving attention not only as a material for display in liquid-crystal TV sets, but also as an element for optoelectronics devices (e.g., photo printer heads, optical Fourier transformation elements, and light valves).

DOBAMBC remains ferroelectric only within a relatively narrow temperature range, and is unsatisfactory in physical and chemical stability because it is a Schiff base. Hence there has been a great demand for new ferroelectric compounds which are stable both physically and chemically, remain ferroelectric over a wide temperature range, have large dielectric constant, and can be driven at low voltage.

SUMMARY OF THE INVENTION

In one aspect of the present invention, there is provided novel biphenyl-based diester compounds represented by the following general formula (1) and liquid crystal compositions containing same.

wherein $R^1$ and $R^2$ represent $C_{1-18}$ alkyl group, alkyl halide group or aralkyl halide, $R^1$ may be the same as or different from $R^2$, X is selected from —$COOCH_2$— or —$OCO$—.

One of the compound of formula (2) can be prepared according to the following steps: (a) reaction of 4-(4'-hydroxy) biphenylcarboxylic acid with an alkylcarboxylic acid chloride to form 4-(4'-alkylcarbonyloxy)biphenylcarboxylic acid, (b) conversion of this acid into corresponding acid chloride by the action of thionyl chloride, and (c) reaction of this acid chloride with an alcohol to afford an ester of 4(4'-alkylcarbonyloxy)biphenylcarboxylic acid.

wherein $R^1$ expresses an alkyl, haloalkyl or haloaralkyl group, and $OR^2$ stands for an alkoxy, haloalkoxy or haloaralkyloxy group.

One of the compounds of formula (3) can be prepared according to the following steps: (a) 4-4'-biphenol with an alkylcarboxylic acid chloride to form 4-(4'-alkylcarbonyloxyphenyl)phenol, (b) reaction of this phenol with an acid in the presence of dicyclohexylcarbodiimide to afford an ester of 4-(4'-alkylcarbonyloxyphenyl)phenol.

wherein $R^1$ expresses an alkyl, haloalkyl or haloaralkyl group, and $OR^2$ stands for an alkoxy, haloalkoxy or haloaralkyloxy group.

The asymmetric carbon source represented by $R^2$ in formula (2) and (3) is derived from the following optically active alcohols and acids:

2-Halo-1-propanols, 2,3-dihalo-1-propanols, 2,3,3,3-tetrahalo-1-propanols, 2-methyl-1-butanol, 3-methyl-1-pentanol, 4-methyl-1-hexanol, 2-butanol, 2-pentanol, 2-hexanol, 2-heptanol, 2-octanol, 1-phenylethanol, linalcol, nerolidol, sobrerol, carbomenthol, menthol, isomethol, borneol, isoborneol, carbenol, cholesterol, 2-halo-2-phenylethanols, 2-phenyl-3-halo-1-propanols, 3-phenyl-2-halo-1-propanols, 1-phenyl-2-halo-1-propanols, 3-halo-2-methyl-1-propanols, 1,1,1-trihalo-2-propanols, 2-halo-1-butanols, 3-halo-1-butanols, 2,3-dihalo-1-butanols, 2,4-dihalo-1-butanols, 3,4-dihalo-1-butanols, 1,1,1-trihalo-2-butanols, 4,4,4-trihalo-3-halo-1-butanols, 2,3,4-trihalo-1-butanols, 3,3,4,4,4-pentahalo-2-butanols, 2-halo-3-methyl-1-butanols, 2-halo-3,3-dimethyl-1-butanols, 2-halo-1-pentanols, 3-halo-1-pentanols, 4-halo-1-pentanols, 2,4-dihalo-1-pentanols, 2,5-dihalo-1-pentanols, 1,1,1-trihalo-2-pentanols, 1,1,1,2,2-pentahalo-3-pentanols, 2-halo-3-methyl-1-pentanols, 2-halo-4-methyl-1-pentanols, 2-halo-3-monohalomethyl-4-methyl-1-pentanols, 2-halo-1-hexanols, 3-halo-1-hexanols, 4-halo-1-hexanols, 5-halo-1-hexanols, 2,5-dihalo-1-hexanols, 2,6-dihalo-1-hexanols, 1,1,1-trihalo-2-hexanols, 2,5,6-trihalo-1-hexanols, 2-halo-1-heptanols, 1,1,1-trihalo-2-heptanols, 2-halo-1-octanols and 1,1,1-trihalo-2-octanols or the corresponding carboxylic acids of the above mentioned compounds.

Some of the optically active alcohols just mentioned can be easily prepared by asymmetric reduction of corresponding ketones by the action of special metal cayalysts, optically active acids and alchols or by microbial or enzymic action. Some other may be derived from optically active amino acids or oxy acids which are found in nature or obtainable by optical resolution, such as valine, leucine, isoleucine, phenylalanine, threonine, homoserine, allo-isoleucine, tert-leucine, 2-aminobutyric acid, norvaline, norleucine, ornitine, lysine, hydroxylysine, phenylglycine, aspartic acid, glutamic acid, mandelic acid, tropic acid, 3-hydroxybutyric acid, malic acid, tartaric acid, and isopropylmalic acid.

The compounds of this invention show ferroelectricity. In addition, these compounds may be combined with a substance which is not ferroelectric, thereby lowering the ferroelectric temperature range without affecting the ferroelectric characteristics. The compounds of this invention may be used either alone or in combination. Use of several compounds in combination leads to lower ferroelectric temperature range with no adverse effect upon ferroelectric characteristics.

The compounds of this invention that are optically active may also be added to a nematic liquid-crystal compound for White-Tayler type color display, for display of cholestric/nematic converion type, and to prevent formation of reversed domain in TN type cells.

It is also possible to use the compounds of the invention, which are smectic liquid-crystal compounds, as memory-type display element for thermal and laser writing.

EXAMPLES

The following Examples further illustrate this invention but are not intended to limit its scope.

The phase transition temperature values in the following description may be varied slightly in dependence on the method of measurements or the purity of the products.

EXAMPLE 1

Preparation and Properties of (S)-3-methyl-2-chlorobutyl 4-(4'-octylcarbonyloxy)biphenylcarboxylate (A)

A dispersion of 4.5 g of 4-(4'-hydroxy)biphenylcarboxylic acid in a mixture of 300 ml of carbon tetrachloride and 50 ml of pyridine, 3.7 g of nonanoyl chloride was added dropwise under reflux, and heating was continued for three hours. After removal of the solvents, a small amount of water was added to decompose unreacted nonancyl chloride, and the residue was washed with methanol, leaving 6.5 g of 4-(4'-octylcarbonyloxy)-biphenylcarboxylic acid (3). (B) was dispersed in 200 ml of carbon tetrachloride, 10 ml of thionyl chloride was added, and the mixture was heated under reflux for three hours. Distilling off the solvnet gave 6.0 g of 4-(4'-octylcarbonyloxy)biphenylcarboxylic acid chloride (C).

To a cooled solution of (C) (1.5 g) in a mixture of 80 ml of carbon tetrachloride and 10 ml of pyridine, was added 0.4 g of (S)-3-methyl-2-chlorobutanol, and the mixture was stirred for some time and then allowed to stand overnight. The crystals which had been separated out were removed by filtration, the solvents were distilled off from the filtrate, and the residue was purified by column chromatography on silica gel, followed by recrystallization from hexane, giving 0.8 g of (A).

Figure 1:
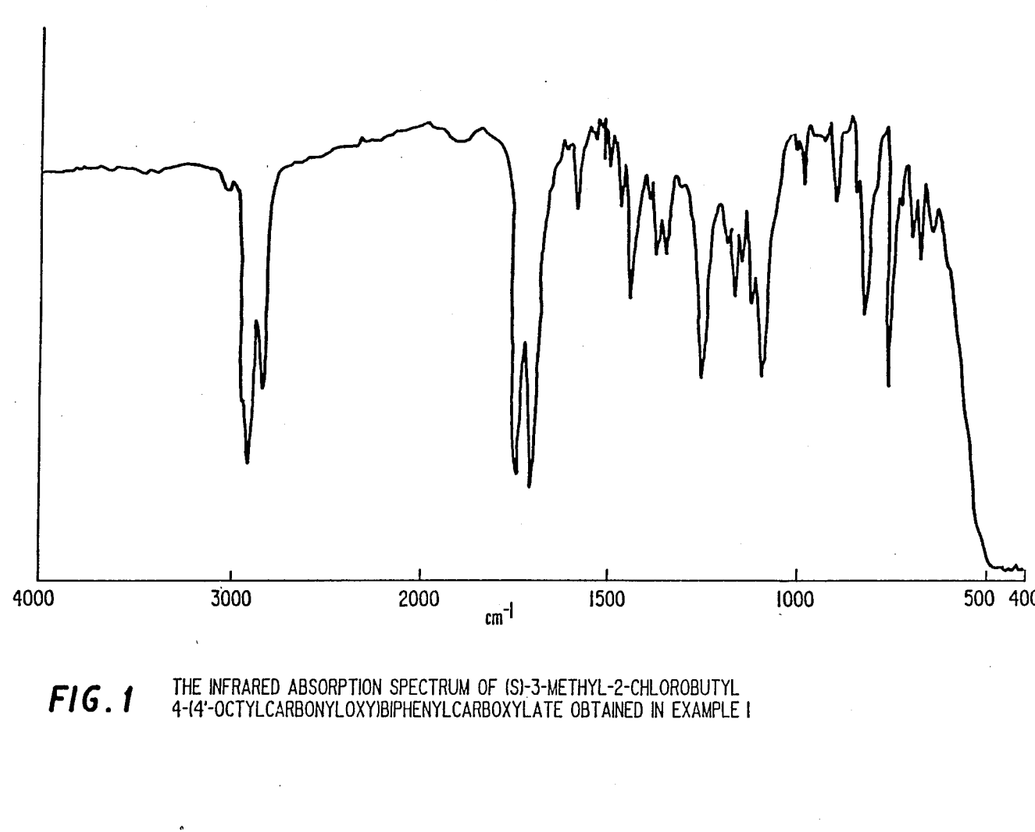
FIG. 1 shows the infrared absorption spectrum of (S)-3-methyl-2-chlorobutyl 4-(4'-octylcarbonyloxy) biphenylcarboxylate obtained in Example 1.

This is a smectic liquid-crystal compound exhibiting both SC* and SA phases. Its phase conversion temperature is shown in Table 1 and its IR spectrum is given in FIG. 1.

Figure 2:
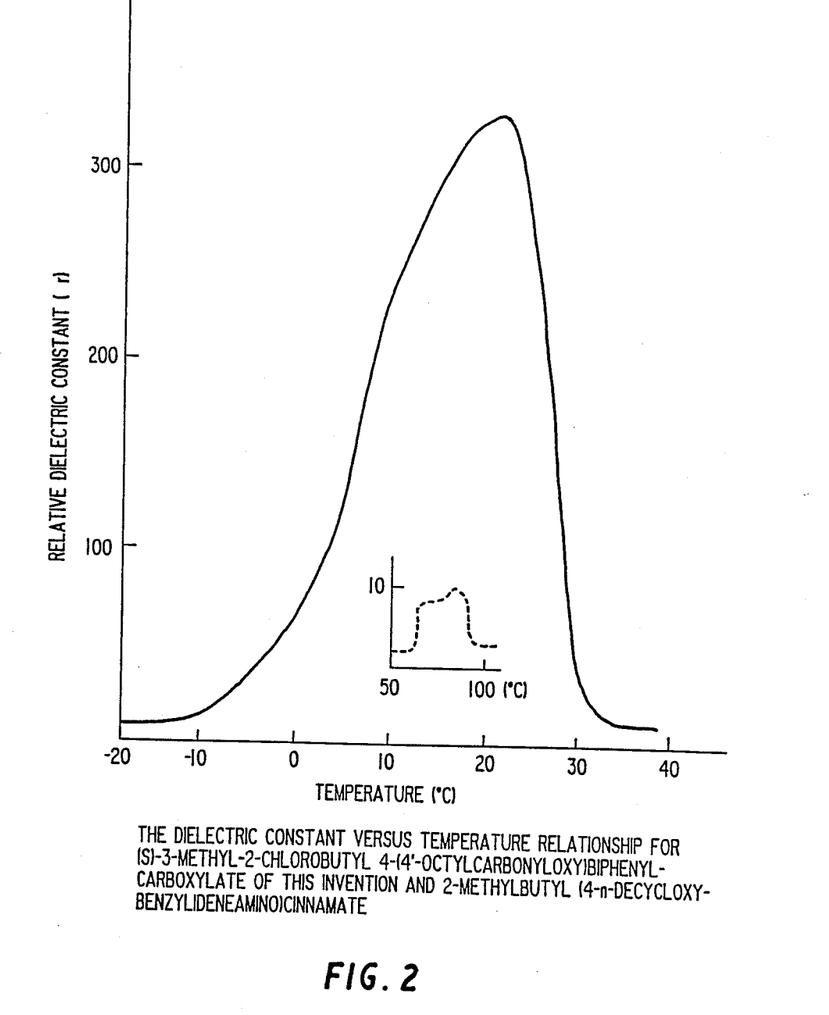
FIG. 2 shows the dielectric constant versus temperature relationship for (S)-3-methyl-2-chlorobutyl 4-(4'-octylcarbonyloxy)biphenylcarboxylate of this invention and 2-methylbutyl (4-n-decyloxybenzylideneamino) cinnamate.

(S)-3-methyl-2-chlorobutyl 4-(4'-octylcarbonyloxy)-biphenylcarboxylate was sealed in a cell made of NESA glass and using 25 μm thick polyethylene terephthalate film as spacer, and its dielectric constant was measured by the bridge method with 100 Hz AC current applied. The result is shown in FIG. 2. The data for DOBAMBC was also shown in the same figure for comparison. It is apparent that (S)-3-methyl-2-chlorobutyl 4-(4'-octylcarbonyloxy)biphenylcarboxylate has far larger dielectric constant (solid line) than DOBAMBC (broken line).

Similarly, (S)-3-methyl-2-chlorobutyl 4-(4'-octylcarbonyloxy)biphenylcarboxylate was sealed in a cell made of NESA glass and using polyethylene terephthalate film as spacer, and its optoelctronic behavior was observed under a microscope while applying square wave signals. Very sharp contrast and quick response were visually confirmed, demonstrating applicability of this comound to liquid-crystal display.

EXAMPLE 2

The following compounds ((1)–(198)) which contain different groups from those of example 1 as $R^1$ and $R^2$ of the general formula (2) can be prepared in the same manner as described in Example 1.

Phase transition temperature of typical compounds of this invention which in shown by the general formula (2) prepared in a similar manner as in Example 1 are listed in Table 1

(2)

In table 1, C stands for a crystal phase, Sc* for a chiral simectic C Phase, Sc* for a chiral sinectic phase, SA for a smectic A phase and I for an isotropic phase.

The phase transition temperature on heating is shown upper part and that or cooling is shown below part in the table.

The absolute configuration of the carbon atom marked * is S form and that marked ** is R form.

(1) 4'-(4''-methylcarbonyloxyphenyl)benzoic acid 2-chloro-3-methylbutyl ester
(2) 4'-(4''-ethylcarbonyloxyphenyl)benzoic acid 2-chloro-3-methylbutyl ester
(3) 4'-(4''-propylcarbonyloxyphenyl)benzoic acid 2-chloro-3-methylbutyl ester
(4) 4'-(4''-butylcarbonyloxyphenyl)benzoic acid 2-chloro-3-methylbutyl ester
(5) 4'-(4''-pentylcarbonyloxyphenyl)benzoic acid 2-chloro-3-methylbutyl ester
(6) 4'-(4''-hexylcarbonyloxyphenyl)benzoic acid 2-chloro-3-methylbutyl ester
(7) 4'-(4''-heptylcarbonyloxyphenyl)benzoic acid 2-chloro-3-methylbutyl ester
(8) 4'-(4''-octylcarbonyloxyphenyl)benzoic acid 2-chloro-3-methylbutyl ester
(9) 4'-(4''-nonylcarbonyloxyphenyl)benzoic acid 2-chloro-3-methylbutyl ester
(10) 4'-(4''-decylcarbonyloxyphenyl)benzoic acid 2-chloro-3-methylbutyl ester
(11) 4'-(4''-undecylcarbonyloxyphenyl)benzoic acid 2-chloro-3-methylbutyl ester
(12) 4'-(4''-dodecylcarbonyloxyphenyl)benzoic acid 2-chloro-3-methylbutyl ester
(13) 4'-(4''-tridecylcarbonyloxyphenyl)benzoic acid 2-chloro-3-methylbutyl ester
(14) 4'-(4''-tetradecylcarbonyloxyphenyl)benzoic acid 2-chloro-3-methylbutyl ester
(15) 4'-(4''-pentadecylcarbonyloxyphenyl)benzoic acid 2-chloro-3-methylbutyl ester
(16) 4'-(4''-hexadecylcarbonyloxyphenyl)benzoic acid 2-chloro-3-methylbutyl ester
(17) 4'-(4''-heptadecylcarbonyloxyphenyl)benzoic acid 2-chloro-3-methylbutyl ester
(18) 4'-(4''-octadecylcarbonyloxyphenyl)benzoic acid 2-chloro-3-methylbutyl ester
(19) 4'-(4''-methylcarbonyloxyphenyl)benzoic acid 2-chloro-3-methylpentyl ester
(20) 4'-(4''-ethylcarbonyloxyphenyl)benzoic acid 2-chloro-3-methylpentyl ester
(21) 4'-(4''-propylcarbonyloxyphenyl)benzoic acid 2-chloro-3-methylpentyl ester
(22) 4'-(4''-butylcarbonyloxyphenyl)benzoic acid 2-chloro-3-methylpentyl ester
(23) 4'-(4''-pentylcarbonyloxyphenyl)benzoic acid 2-chloro-3-methylpentyl ester
(24) 4'-(4''-hexylcarbonyloxyphenyl)benzoic acid 2-chloro-3-methylpentyl ester
(25) 4'-(4''-heptylcarbonyloxyphenyl)benzoic acid 2-chloro-3-methylpentyl ester
(26) 4'-(4''-octylcarbonyloxyphenyl)benzoic acid 2-chloro-3-methylpentyl ester
(27) 4'-(4''-nonylcarbonyloxyphenyl)benzoic acid 2-chloro-3-methylpentyl ester
(28) 4'-(4''-decylcarbonyloxyphenyl)benzoic acid 2-chloro-3-methylpentyl ester
(29) 4'-(4''-undecylcarbonyloxyphenyl)benzoic acid 2-chloro-3-methylpentyl ester
(30) 4'-(4''-dodecylcarbonyloxyphenyl)benzoic acid 2-chloro-3-methylpentyl ester
(31) 4'-(4''-tridecylcarbonyloxyphenyl)benzoic acid 2-chloro-3-methylpentyl ester
(32) 4'-(4''-tetradecylcarbonyloxyphenyl)benzoic acid 2-chloro-3-methylpentyl ester
(33) 4'-(4''-pentadecylcarbonyloxyphenyl)benzoic acid 2-chloro-3-methylpentyl ester
(34) 4'-(4''-hexadecylcarbonyloxyphenyl)benzoic acid 2-chloro-3-methylpentyl ester
(35) 4'-(4''-heptadecylcarbonyloxyphenyl)benzoic acid 2-chloro-3-methylpentyl ester
(36) 4'-(4''-octadecylcarbonyloxyphenyl)benzoic acid 2-chloro-3-methylpentyl ester
(37) 4'-(4''-methylcarbonyloxyphenyl)benzoic acid 2-chloro-4-methylpentyl ester
(38) 4'-(4''-ethylcarbonyloxyphenyl)benzoic acid 2-chloro-4-methylpentyl ester
(39) 4'-(4''-propylcarbonyloxyphenyl)benzoic acid 2-chloro-4-methylpentyl ester
(40) 4'-(4''-butylcarbonyloxyphenyl)benzoic acid 2-chloro-4-methylpentyl ester
(41) 4'-(4''-pentylcarbonyloxyphenyl)benzoic acid 2-chloro-4-methylpentyl ester
(42) 4'-(4''-hexylcarbonyloxyphenyl)benzoic acid 2-chloro-4-methylpentyl ester
(43) 4'-(4''-heptylcarbonyloxyphenyl)benzoic acid 2-chloro-4-methylpentyl ester
(44) 4'-(4''-octylcarbonyloxyphenyl)benzoic acid 2-chloro-4-methylpentyl ester
(45) 4'-(4''-nonylcarbonyloxyphenyl)benzoic acid 2-chloro-4-methylpentyl ester
(46) 4'-(4''-decylcarbonyloxyphenyl)benzoic acid 2-chloro-4-methylpentyl ester
(47) 4'-(4''-undecylcarbonyloxyphenyl)benzoic acid 2-chloro-4-methylpentyl ester
(48) 4'-(4''-dodecylcarbonyloxyphenyl)benzoic acid 2-chloro-4-methylpentyl ester
(49) 4'-(4''-tridecylcarbonyloxyphenyl)benzoic acid 2-chloro-4-methylpentyl ester
(50) 4'-(4''-tetradecylcarbonyloxyphenyl)benzoic acid 2-chloro-4-methylpentyl ester
(51) 4'-(4''-pentadecylcarbonyloxyphenyl)benzoic acid 2-chloro-4-methylpentyl ester
(52) 4'-(4''-hexadecylcarbonyloxyphenyl) benzoic acid 2-cholor-4-methylpentyl ester
(53) 4'-(4''-heptadecylcarbonyloxyphenyl)benzoic acid 2-chloro-4-methylpentyl ester
(54) 4'-(4''-octadecylcarbonyloxyphenyl)benzoic acid 2-chloro-4-methylpentyl ester
(55) 4'-(4''-methylcarbonyloxyphenyl)benzoic acid 2-chloro-3-phenylpropyl ester
(56) 4'-(4''-ethylcarbonyloxyphenyl)benzoic acid 2-chloro-3-phenylpropyl ester
(57) 4'-(4''-propylcarbonyloxyphenyl)benzoic acid 2-chloro-3-phenylpropyl ester
(58) 4'-(4''-butylcarbonyloxyphenyl)benzoic acid 2-chloro-3-phenylpropyl ester
(59) 4'-(4''-pentylcarbonyloxyphenyl)benzoic acid 2-chloro-3-phenylpropyl ester
(60) 4'-(4''-hexylcarbonyloxyphenyl)benzoic acid 2-chloro-3-phenylpropyl ester (61) 4'-(4''-heptylcarbonyloxyphenyl)benzoic acid 2-chloro-3-phenylpropyl ester
(62) 4'-(4''-octylcarbonyloxyphenyl)benzoic acid 2-chloro-3-phenylpropyl ester
(63) 4'-(4''-nonylcarbonyloxyphenyl)benzoic acid 2-chloro-3-phenylpropyl ester
(64) 4'-(4''-decylcarbonyloxyphenyl)benzoic acid 2-chloro-3-phenylpropyl ester
(65) 4'-(4''-undecylcarbonyloxyphenyl)benzoic acid 2-chloro-3-phenylpropyl ester
(66) 4'-(4''-dodecylcarbonyloxyphenyl)benzoic acid 2-chloro-3-phenylpropyl ester
(67) 4'-(4''-tridecylcarbonyloxyphenyl)benzoic acid 2-chloro-3-phenylpropyl ester
(68) 4'-(4''-tetradecylcarbonyloxyphenyl)benzoic acid 2-chloro-3-phenylpropyl ester
(69) 4'-(4''-pentadecylcarbonyloxyphenyl)benzoic acid 2-chloro-3-phenylpropyl ester
(70) 4'-(4''-hexadecylcarbonyloxyphenyl)benzoic acid 2-chloro-3-phenylpropyl ester
(71) 4'-(4''-heptadecylcarbonyloxyphenyl)benzoic acid 2-chloro-3-phenylpropyl ester
(72) 4'-(4''-octadecylcarbonyloxyphenyl)benzoic acid 2-chloro-3-phenylpropyl ester
(73) 4'-(4''-methylcarbonyloxyphenyl)benzoic acid 2-methylbutyl ester
(74) 4'-(4''-ethylcarbonyloxyphenyl)benzoic acid 2-methylbutyl ester
(75) 4'-(4''-propylcarbonyloxyphenyl)benzoic acid 2-methylbutyl ester
(76) 4'-(4''-butylcarbonyloxyphenyl)benzoic acid 2-methylbutyl ester
(77) 4'-(4''-pentylcarbonyloxyphenyl)benzoic acid 2-methylbutyl ester
(78) 4'-(4''-hexylcarbonyloxyphenyl)benzoic acid 2-methylbutyl ester
(79) 4'-(4''-heptylcarbonyloxyphenyl)benzoic acid 2-methylbutyl ester
(80) 4'-(4''-octylcarbonyloxyphenyl)benzoic acid 2-methylbutyl ester
(81) 4'-(4''-nonylcarbonyloxyphenyl)benzoic acid 2-methylbutyl ester
(82) 4'-(4''-decylcarbonyloxyphenyl)benzoic acid 2-methylbutyl ester
(83) 4'-(4''-undecylcarbonyloxyphenyl)benzoic acid 2-methylbutyl ester
(84) 4'-(4''-dodecylcarbonyloxyphenyl)benzoic acid 2-methylbutyl ester
(85) 4'-(4''-tridecylcarbonyloxyphenyl)benzoic acid 2-methylbutyl ester
(86) 4'-(4''-tetradecylcarbonyloxyphenyl)benzoic acid 2-methylbutyl ester
(87) 4'-(4''-pentadecylcarbonyloxyphenyl)benzoic acid 2-methylbutyl ester
(88) 4'-(4''-hexadecylcarbonyloxyphenyl)benzoic acid 2-methylbutyl ester
(89) 4'-(4''-heptadecylcarbonyloxyphenyl)benzoic acid 2-methylbutyl ester
(90) 4'-(4''-octadecylcarbonyloxyphenyl)benzoic acid 2-methylbutyl ester
(91) 4'-(4''-methylcarbonyloxyphenyl)benzoic acid 3-methylpentyl ester
(92) 4'-(4''-ethylcarbonyloxyphenyl)benzoic acid 3-methylpentyl ester
(93) 4'-(4''-propylcarbonyloxyphenyl)benzoic acid 3-methylpentyl ester
(94) 4'-(4''-butylcarbonyloxyphenyl)benzoic acid 3-methylpentyl ester
(95) 4'-(4''-pentylcarbonyloxyphenyl)benzoic acid 3-methylpentyl ester
(96) 4'-(4''-hexylcarbonyloxyphenyl)benzoic acid 3-methylpentyl ester
(97) 4'-(4''-heptylcarbonyloxyphenyl)benzoic acid 3-methylpentyl ester
(98) 4'-(4''-octylcarbonyloxyphenyl)benzoic acid 3-methylpentyl ester
(99) 4'-(4''-nonylcarbonyloxyphenyl)benzoic acid 3-methylpentyl ester
(100) 4'-(4''-decylcarbonyloxyphenyl)benzoic acid 3-methylpentyl ester
(101) 4'-(4''-undecylcarbonyloxyphenyl)benzoic acid 3-methylpentyl ester
(102) 4'-(4''-dodecylcarbonyloxyphenyl)benzoic acid 3-methylpentyl ester
(103) 4'-(4''-tridecylcarbonyloxyphenyl)benzoic acid 3-methylpentyl ester
(104) 4'-(4''-tetradecylcarbonyloxyphenyl)benzoic acid 3-methylpentyl ester
(105) 4'-(4''-pentadecylcarbonyloxyphenyl)benzoic acid 3-methylpentyl ester
(106) 4'-(4''-hexadecylcarbonyloxyphenyl)benzoic acid 3-methylpentyl ester
(107) 4'-(4''-heptadecylcarbonyloxyphenyl)benzoic acid 3-methylpentyl ester
(108) 4'-(4''-octadecylcarbonyloxyphenyl)benzoic acid 3-methylpentyl ester
(109) 4'-(4''-methylcarbonyloxyphenyl)benzoic acid 1-methylpropyl ester
(110) 4'-(4''-ethylcarbonyloxyphenyl)benzoic acid 1-methylpropyl ester
(111) 4'-(4''-propylcarbonyloxyphenyl)benzoic acid 1-methylpropyl ester
(112) 4'-(4''-butylcarbonyloxyphenyl)benzoic acid 1-methylpropyl ester
(113) 4'-(4''-pentylcarbonyloxyphenyl)benzoic acid 1-methylpropyl ester
(114) 4'-(4''-hexylcarbonyloxyphenyl)benzoic acid 1-methylpropyl ester
(115) 4'-(4''-heptylcarbonyloxyphenyl)benzoic acid 1-methylpropyl ester
(116) 4'-(4''-octylcarbonyloxyphenyl)benzoic acid 1-methylpropyl ester
(117) 4'-(4''-nonylcarbonyloxyphenyl)benzoic acid 1-methylpropyl ester
(118) 4'-(4''-decylcarbonyloxyphenyl)benzoic acid 1-methylpropyl ester
(119) 4'-(4''-undecylcarbonyloxyphenyl)benzoic acid 1-methylpropyl ester
(120) 4'-(4''-dodecylcarbonyloxyphenyl)benzoic acid 1-methylpropyl ester
(121) 4'-(4''-tridecylcarbonyloxyphenyl)benzoic acid 1-methylpropyl ester
(122) 4'-(4''-tetradecylcarbonyloxyphenyl)benzoic acid 1-methylpropyl ester
(123) 4'-(4''-pentadecylcarbonyloxyphenyl)benzoic acid 1-methylpropyl ester
(124) 4'-(4''-hexadecylcarbonyloxyphenyl)benzoic acid 1-methylpropyl ester
(125) 4'-(4''-heptadecylcarbonyloxyphenyl)benzoic acid 1-methylpropyl ester
(126) 4'-(4''-octadecylcarbonyloxyphenyl)benzoic acid 1-methylpropyl ester
(127) 4'-(4''-methylcarbonyloxyphenyl)benzoic acid 1-methylheptyl ester
(128) 4'-(4''-ethylcarbonyloxyphenyl)benzoic acid 1-methylheptyl ester (129) 4'-(4''-propylcarbonyloxyphenyl)benzoic acid 1-methylheptyl ester
(130) 4'-(4''-butylcarbonyloxyphenyl)benzoic acid 1-methylheptyl ester
(131) 4'-(4''-pentylcarbonyloxyphenyl)benzoic acid 1-methylheptyl ester
(132) 4'-(4''-hexylcarbonyloxyphenyl)benzoic acid 1-methylheptyl ester
(133) 4'-(4''-heptylcarbonyloxyphenyl)benzoic acid 1-methylheptyl ester
(134) 4'-(4''-octylcarbonyloxyphenyl)benzoic acid 1-methylheptyl ester
(135) 4'-(4''-nonylcarbonyloxyphenyl)benzoic acid 1-methylheptyl ester
(136) 4'-(4''-decylcarbonyloxyphenyl)benzoic acid 1-methylheptyl ester
(137) 4'-(4''-undecylcarbonyloxyphenyl)benzoic acid 1-methylheptyl ester
(138) 4'-(4''-dodecylcarbonyloxyphenyl)benzoic acid 1-methylheptyl ester
(139) 4'-(4''-tridecylcarbonyloxyphenyl)benzoic acid 1-methylheptyl ester
(140) 4'-(4''-tetradecylcarbonyloxyphenyl)benzoic acid 1-methylheptyl ester
(141) 4'-(4''-pentadecylcarbonyloxyphenyl)benzoic acid 1-methylheptyl ester
(142) 4'-(4''-hexadecylcarbonyloxyphenyl)benzoic acid 1-methylheptyl ester
(143) 4'-(4''-heptadecylcarbonyloxyphenyl)benzoic acid 1-methylheptyl ester
(144) 4'-(4''-octadecylcarbonyloxyphenyl)benzoic acid 1-methylheptyl ester
(145) 4'-(4''-methylcarbonyloxyphenyl)benzoic acid 3-methylbutyl ester
(146) 4'-(4''-ethylcarbonyloxyphenyl)benzoic acid 3-methylbutyl ester
(147) 4'-(4''-propylcarbonyloxyphenyl)benzoic acid 3-methylbutyl ester
(148) 4'-(4''-butylcarbonyloxyphenyl)benzoic acid 3-methylbutyl ester
(149) 4'-(4''-pentylcarbonyloxyphenyl)benzoic acid 3-methylbutyl ester
(150) 4'-(4''-hexylcarbonyloxyphenyl)benzoic acid 3-methylbutyl ester
(151) 4'-(4''-heptylcarbonyloxyphenyl)benzoic acid 3-methylbutyl ester
(152) 4'-(4''-octylcarbonyloxyphenyl)benzoic acid 3-methylbutyl ester
(153) 4'-(4''-nonylcarbonyloxyphenyl)benzoic acid 3-methylbutyl ester
(154) 4'-(4''-decylcarbonyloxyphenyl)benzoic acid 3-methylbutyl ester
(155) 4'-(4''-undecylcarbonyloxyphenyl)benzoic acid 3-methylbutyl ester
(156) 4'-(4''-dodecylcarbonyloxyphenyl)benzoic acid 3-methylbutyl ester
(157) 4'-(4''-tridecylcarbonyloxyphenyl)benzoic acid 3-methylbutyl ester
(158) 4'-(4''-tetradecylcarbonyloxyphenyl)benzoic acid 3-methylbutyl ester
(159) 4'-(4''-pentadecylcarbonyloxyphenyl)benzoic acid 3-methylbutyl ester
(160) 4'-(4''-hexadecylcarbonyloxyphenyl)benzoic acid 3-methylbutyl ester
(161) 4'-(4''-heptadecylcarbonyloxyphenyl)benzoic acid 3-methylbutyl ester
(162) 4'-(4''-octadecylcarbonyloxyphenyl)benzoic acid 3-methylbutyl ester
(163) 4'-(4''-methylcarbonyloxyphenyl)benzoic acid butyl ester
(164) 4'-(4''-ethylcarbonyloxyphenyl)benzoic acid butyl ester
(165) 4'-(4''-propylcarbonyloxyphenyl)benzoic acid butyl ester
(166) 4'-(4''-butylcarbonyloxyphenyl)benzoic acid butyl ester
(167) 4'-(4''-pentylcarbonyloxyphenyl)benzoic acid butyl ester
(168) 4'-(4''-hexylcarbonyloxyphenyl)benzoic acid butyl ester
(169) 4'-(4''-heptylcarbonyloxyphenyl)benzoic acid butyl ester
(170) 4'-(4''-octylcarbonyloxyphenyl)benzoic acid butyl ester
(171) 4'-(4''-nonylcarbonyloxyphenyl)benzoic acid butyl ester
(172) 4'-(4''-decylcarbonyloxyphenyl)benzoic acid butyl ester
(173) 4'-(4''-undecylcarbonyloxyphenyl)benzoic acid butyl ester
(174) 4'-(4''-dodecylcarbonyloxyphenyl)benzoic acid butyl ester
(175) 4'-(4''-tridecylcarbonyloxyphenyl)benzoic acid butyl ester
(176) 4'-(4''-tetradecylcarbonyloxyphenyl)benzoic acid butyl ester
(177) 4'-(4''-pentadecylcarbonyloxyphenyl)benzoic acid butyl ester
(178) 4'-(4''-hexadecylcarbonyloxyphenyl)benzoic acid butyl ester
(179) 4'-(4''-heptadecylcarbonyloxyphenyl)benzoic acid butyl ester
(180) 4'-(4''-octadecylcarbonyloxyphenyl)benzoic acid butyl ester
(181) 4'-(4''-methylcarbonyloxyphenyl)benzoic acid 1-methylbutyl ester
(182) 4'-(4''-ethylcarbonyloxyphenyl)benzoic acid 1-methylbutyl ester
(183) 4'-(4''-propylcarbonyloxyphenyl)benzoic acid 1-methylbutyl ester
(184) 4'-(4''-butylcarbonyloxyphenyl)benzoic acid 1-methylbutyl ester
(185) 4'-(4''-pentylcarbonyloxyphenyl)benzoic acid 1-methylbutyl ester
(186) 4'-(4''-hexylcarbonyloxyphenyl)benzoic acid 1-methylbutyl ester
(187) 4'-(4''-heptylcarbonyloxyphenyl)benzoic acid 1-methylbutyl ester
(188) 4'-(4''-octylcarbonyloxyphenyl)benzoic acid 1-methylbutyl ester
(189) 4'-(4''-nonylcarbonyloxyphenyl)benzoic acid 1-methylbutyl ester
(190) 4'-(4''-decylcarbonyloxyphenyl)benzoic acid 1-methylbutyl ester
(191) 4'-(4''-undecylcarbonyloxyphenyl)benzoic acid 1-methylbutyl ester
(192) 4'-(4''-dodecylcarbonyloxyphenyl)benzoic acid 1-methylbutyl ester
(193) 4'-(4''-tridecylcarbonyloxyphenyl)benzoic acid 1-methylbutyl ester
(194) 4'-(4''-tetradecylcarbonyloxyphenyl)benzoic acid 1-methylbutyl ester
(195) 4'-(4''-pentadecylcarbonyloxyphenyl)benzoic acid 1-methylbutyl ester
(196) 4'-(4''-hexadecylcarbonyloxyphenyl)benzoic acid 1-methylbutyl ester (197) 4'-(4''-heptadecylcarbonyloxyphenyl)benzoic acid 1-methylbutyl ester
(198) 4'-(4''-octadecylcarbonyloxyphenyl)benzoic acid 1-methylbutyl ester

TABLE 1

| R₁ | R₂ | \multicolumn{5}{c}{Phase transition temperature (°C.)} |
|----|----|---|----|-----|-----|-----|
|    |    | C | S* | SC* | SA  | l   |
| $C_6H_{13}$ | $\begin{array}{c}\text{Cl CH}_3\\| \quad |\\-CH_2CHCHC_2H_5\\* \quad *\end{array}$ | ● ● |  | 2.3● | 31● 10● | 40● 40● |
| $C_7H_{15}$ |  | ● ● |  | 39● | 39● | 61~75● 56● |
| $C_8H_{17}$ |  | ● ● | −10● | 15● 13~16● | 32● 31● | 48~50● 48~49● |
| $C_9H_{19}$ |  | ● ● |  | 27● 10● | 40● 40● | 52~53● 53● |
| $C_{10}H_{21}$ |  | ● ● |  | 36● 19● | 41● 37~40● | 51~54● 47~52● |
| $C_{11}H_{23}$ |  | ● ● |  | 31~35● 28● | 42● 42● | 55● 55● |
| $C_{12}H_{25}$ |  | ● ● |  | 40● 31● | 43● 43● | 57● 57● |
| $C_{13}H_{27}$ |  | ● ● |  | 45● 35● | 47● 47● | 60● 60● |
| $C_6H_{13}$ | $\begin{array}{c}\text{Cl CH}_3\\| \quad |\\-CH_2CHCHCH_3\\*\end{array}$ | ● ● |  | 15● | 15● | 41~46● 38~45● |
| $C_8H_{17}$ |  | ● ● |  | 34● −4● | 34● 34● | 51~54● 49~53● |
| $C_9H_{19}$ |  | ● ● |  | 38~39● 20● | 44● 44● | 58● 58● |
| $C_{10}H_{21}$ |  | ● ● |  | 36● 21~24● | 45● 45● | 58● 58● |
| $C_{11}H_{23}$ |  | ● ● |  | 34● | 50~55● 49● | 60● 60● |
| $C_{12}H_{25}$ |  | ● ● |  | 44● | 52● 47● | 61● 61● |
| $C_{13}H_{27}$ |  | ● ● |  |  | 57● 49● | 61● 61● |
| $C_8H_{17}$ | $\begin{array}{c}\text{CH}_3\\|\\-CH_2CH_2CHC_2H_5\\*\end{array}$ | ● ● | 14● | 40~43● 40● | 48● 48● | 64~67● 61~65● |
| $C_9H_{19}$ |  | ● ● | 41● 26~28● | 45● 45● | 53● 53● | 64~67● 63~67● |
| $C_{10}H_{21}$ |  | ● ● | 45● 29● | 53● 53● | 67● 67● | 74● 73● |
| $C_6H_{13}$ | $\begin{array}{c}\text{Cl CH}_3\\|\\-CH_2CHCHCHCH_3\\*\end{array}$ | ● ● |  | −20~−2● | 4● | 34~36● 30● |
| $C_8H_{17}$ |  | ● ● | −5● | 0● | 35● 30● | 40● 40● |
| $C_9H_{19}$ |  | ● |  |  |  | 39~50● |
| $C_{10}H_{21}$ |  | ● ● |  | 15● 26~28● | 36● 40● | 45● 47● |
| $C_{11}H_{23}$ |  | ● ● |  | 16● | 40● 35● | 46● 47● |
| $C_{12}H_{25}$ |  | ● ● |  | 40.5● | 31● 42● | 47● 48● 44~48● |
| $C_6H_{13}$ | $\begin{array}{c}\text{CH}_3\\|\\-CHC_2H_5\\*\end{array}$ | ● ● |  |  | 27● | 41~43● 27~36● |
| $C_7H_{15}$ |  | ● ● |  |  |  | 48~62● 30~55● |
| $C_8H_{17}$ |  | ● ● |  |  | 27~28● | 40● 40● |

TABLE 1-continued

| R₁ | R₂ | C | S* | SC* | SA | 1 |
|---|---|---|---|---|---|---|
| C₇H₁₅ | CH₃<br>\|<br>—CH₂CHC₂H₅ | ● | | | 35● | 58● |
| | | ● | | 17● | 33● | 58● |
| C₈H₁₇ | | ● | | | 23● | 49● |
| | | ● | | 10● | 17● | 49● |
| C₉H₁₉ | | ● | | 38.4● | 46.2● | 61.5● |
| | | ● | | 21● | 46.6● | 61.1● |
| C₁₀H₂₁ | | ● | | 44.5● | 47● | 62● |
| | | ● | | 29● | 47● | 62● |
| C₁₁H₂₃ | | ● | | 40● | 50● | 63● |
| | | ● | | 34● | 50● | 63● |
| C₁₂H₂₅ | | ● | | 46● | 48.5● | 62● |
| | | ● | | 35● | 48.5● | 62● |
| C₁₃H₂₇ | | ● | | | 50● | 64● |
| | | ● | | 46● | 51● | 64● |
| C₇H₁₅ | CH₃<br>\|<br>—CH₂CH₂CHCH₃ | ● | | | 74● | 112–20● |
| | | ● | 23~25● | | 75~79● | 108–17● |
| C₈H₁₇ | | ● | 43● | | 54● | 72● |
| | | ● | 18● | | 54● | 71● |
| C₇H₁₅ | —CH₂—CH₂CH₂CH₃ | ● | | | 61● | 111–13● |
| | | ● | | | 23~25● | 106–10● |
| C₈H₁₇ | | ● | 21● | | 53● | 69~73● |
| | | ● | 7~9● | | 53● | 69~72● |
| C₈H₁₇ | CH₃<br>\|<br>—CHC₃H₇<br>* | ● | | | | 46~48● |
| | | ● | | | | 42● |
| C₁₂H₂₅ | | ● | | | | 43● |
| | | ● | | | | 41● |
| C₈H₁₇ | Cl  CH₃<br>\|   \|<br>—CH₂—CH—CHC₂H₅<br>*  * | ● | —11● | ●<br>~7● | 37●<br>37● | 47●<br>47● |
| C₉H₁₉ | | ● | | ● | 41● | 51● |
| | | ● | —10~● | 6~8● | 41● | 51● |
| C₁₀H₂₁ | | ● | | 35● | 44● | 52● |
| | | ● | | 13~15● | 44● | 52● |

EXAMPLE 3

Preparation and Properties of (S,S)-3-methyl-2-chloropentanoic acid 4'-(4''-heptylcarbonyloxyphenyl)phenyl ester (D)

To a solution of 40 g of 4-(4'-biphenol) in 50 ml of pyridine, 19 ml of octanoyl Chloride was added dropwise with stiring, and the mixture was heated for one hour. After cooling to room temperature, some amount of water was added to the mixture, and the crystals which had been separated out were collected by filtration. Soxhlet extraction with tolvene was carried out, and distilling off the solvent gave 4-4'-heptylcarbonyloxyphenyl)phenyl (E). The product was purified by column chromatography on silica gel, if necessary.

An 8 g amount (E), 6.2 g of N,N'-dicyclohexylcarbodiimide, 4.5 g of (S,S)-1-chrolo-2-methylbutyl carboxylic acid, 1 g of 4-pyrrolidinopyridine and 500 ml of tetrachloromethane were mixed and allowed to stand for six hours. After the precipitate was removed the solution was evaporated to obtain a crude product. The product was passed through a chromatographic column of silica whereby purified (D).

Figure 3:
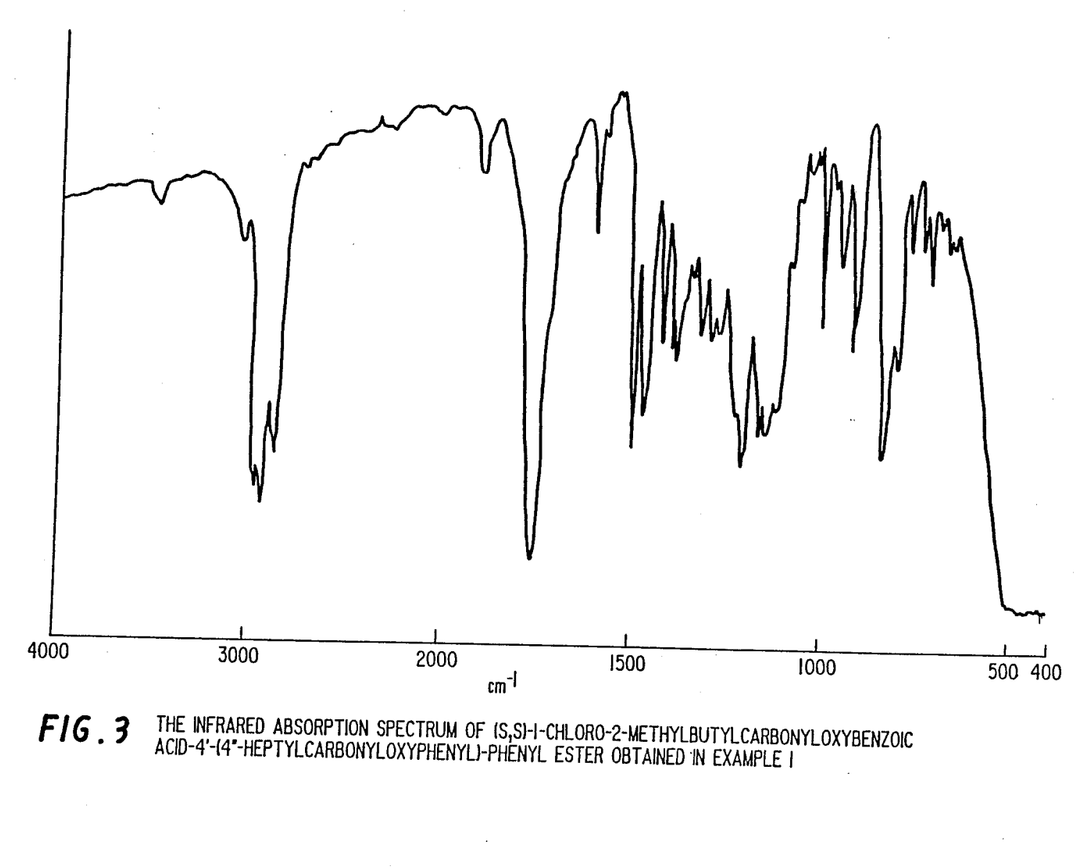
FIG. 3 shows the Infrared Absorption Spectrum of (S,S)-1-chloro-2-methylbutyl-carbonyloxybenzoic acid-4'-(4''-heptylcarbonyloxyphenyl)-phenyl ester obtained in Example 1.

This compounds is a smectic liquid-crystal compound exhibiting both Sc* and S* phases. Its phase transition temperature is shown in Table 2 and its IR spectrum is given in FIG. 3.

Figure 4:
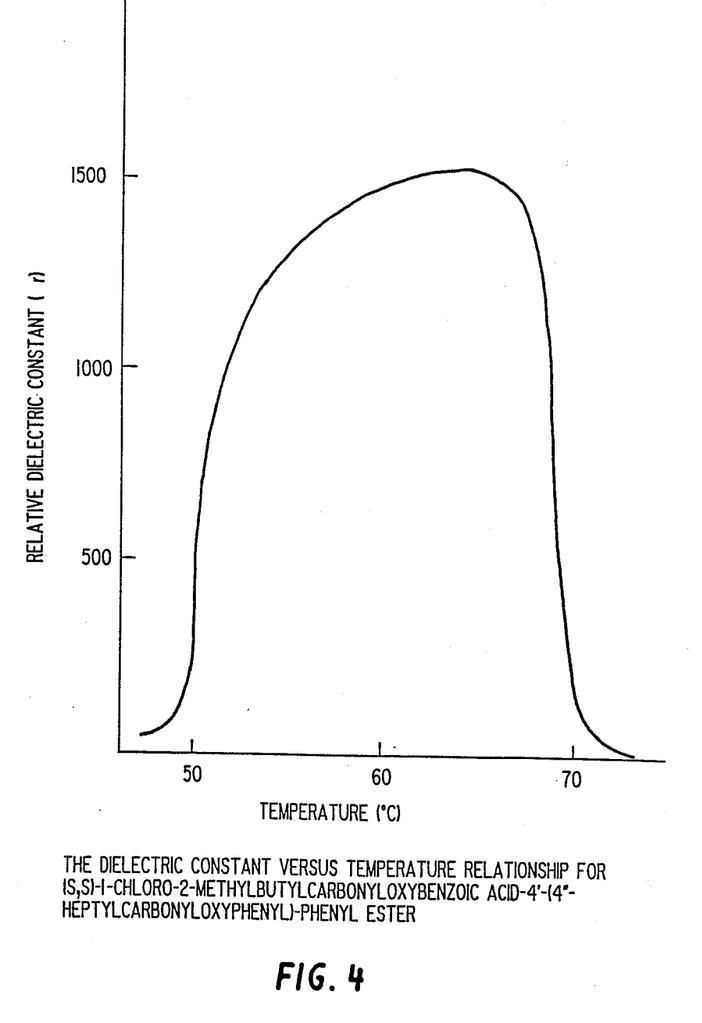
FIG. 4 shows the dielectric constant versus temperature relationship for (S,S)-1-chloro-2-methylbutylcarbonyl-oxybenzoic acid-4'-(4''-heptylcarbonyloxyphenyl)-phenyl ester.

The dielectric constant of (D) can be measured in the same manner as described in Example 1. The result is shown in FIG. 4. And this compound indicates maximum spontaneous polarization of 210nC/cm².

The liquid crystal cell, wherein (D) was sealed was placed between two crossing palarizers and the change of the intensity of the tranmitted light when the electric field was applid was measured. The response time was under 100 micro seconds.

EXAMPLE 4

The following compounds ((199)–(306)) which contain different groups from those of example 3 as $R^1$ and $R^3$ of the general formula (3) can be prepared in the same manner as described in example 3.

Phase transition temperature of typical compounds of this invention, which is shown by the general formula (3) prepared in a similar manner as Example 3, are listed in Table 2.

The symbols used have the same meaning as in Table 1, except S1 and S2, which stand for unkonwn smectic phases.

(199) 1-chloro-2-methylbutanoic acid 4'-(4''-methylcarbonyloxyphenyl)phenyl ester (200) 1-chloro-2-methylbutanoic acid 4'-(4''-ethylcarbonyloxyphenyl)phenyl ester
(201) 1-chloro-2-methylbutanoic acid 4'-(4''-propylcarbonyloxyphenyl)phenyl ester
(202) 1-chloro-2-methylbutanoic acid 4'-(4''-butylcarbonyloxyphenyl)phenyl ester
(203) 1-chloro-2-methylbutanoic acid 4'-(4''-pentylcarbonyloxyphenyl)phenyl ester
(204) 1-chloro-2-methylbutanoic acid 4'-(4''-hexylcarbonyloxyphenyl)phenyl ester
(205) 1-chloro-2-methylbutanoic acid 4'-(4''-heptylcarbonyloxyphenyl)phenyl ester
(206) 1-chloro-2-methylbutanoic acid 4'-(4''-octylcarbonyloxyphenyl)phenyl ester
(207) 1-chloro-2-methylbutanoic acid 4'-(4''-nonylcarbonyloxyphenyl)phenyl ester
(208) 1-chloro-2-methylbutanoic acid 4'-(4''-decylcarbonyloxyphenyl)phenyl ester
(209) 1-chloro-2-methylbutanoic acid 4'-(4''-undecylcarbonyloxyphenyl)phenyl ester
(210) 1-chloro-2-methylbutanoic acid 4'-(4''-dodecylcarbonyloxyphenyl)phenyl ester
(211) 1-chloro-2-methylbutanoic acid 4'-(4''-tridecylcarbonyloxyphenyl)phenyl ester
(212) 1-chloro-2-methylbutanoic acid 4'-(4''-tetradecylcarbonyloxy-phenyl)phenyl ester
(213) 1-chloro-2-methylbutanoic acid 4'-(4''-pentadecylcarbonyloxy-phenyl)phenyl ester
(214) 1-chloro-2-methylbutanoic acid 4'-(4''-hexadecylcarbonyloxy-phenyl)phenyl ester
(215) 1-chloro-2-methylbutanoic acid 4'-(4''-heptadecylcarbonyloxy-phenyl)phenyl ester
(216) 1-chloro-2-methylbutanoic acid 4'-(4''-octadecylcarbonyloxy-phenyl)phenyl ester
(217) 1-chloro-2-methylpentanoic acid 4'-(4''-methylcarbonyloxyphenyl)phenyl ester
(218) 1-chloro-2-methylpentanoic acid 4'-(4''-ethylcarbonyloxyphenyl)phenyl ester
(219) 1-chloro-2-methylpentanoic acid 4'-(4''-propylcarbonyloxyphenyl)phenyl ester
(220) 1-chloro-2-methylpentanoic acid 4'-(4''-butylcarbonyloxyphenyl)phenyl ester
(221) 1-chloro-2-methylpentanoic acid 4'-(4''-pentylcarbonyloxyphenyl)phenyl ester
(222) 1-chloro-2-methylpentanoic acid 4'-(4''-hexylcarbonyloxyphenyl)phenyl ester
(223) 1-chloro-2-methylpentanoic acid 4'-(4''-heptylcarbonyloxyphenyl)phenyl ester
(224) 1-chloro-2-methylpentanoic acid 4'-(4''-octylcarbonyloxyphenyl)phenyl ester
(225) 1-chloro-2-methylpentanoic acid 4'-(4''-nonylcarbonyloxyphenyl)phenyl ester
(226) 1-chloro-2-methylpentanoic acid 4'-(4''-decylcarbonyloxyphenyl)phenyl ester
(227) 1-chloro-2-methylpentanoic acid 4'-(4''-undecylcarbonyloxy-phenyl)phenyl ester
(228) 1-chloro-2-methylpentanoic acid 4'-(4''-dodecylcarbonyloxy-phenyl)phenyl ester
(229) 1-chloro-2-methylpentanoic acid 4'-(4''-tridecylcarbonyloxy-phenyl)phenyl ester
(230) 1-chloro-2-methylpentanoic acid 4'-(4''-tetradecylcarbonyloxy-phenyl)phenyl ester
(231) 1-chloro-2-methylpentanoic acid 4'-(4''-pentadecylcarbonyloxy-phenyl)phenyl ester
(232) 1-chloro-2-methylpentanoic acid 4'-(4''-hexadecylcarbonyloxy-phenyl)phenyl ester
(233) 1-chloro-2-methylpentanoic acid 4'-(4''-heptadecylcarbonyloxy-phenyl)phenyl ester
(234) 1-chloro-2-methylpentanoic acid 4'-(4''-octadecylcarbonyloxy-phenyl)phenyl ester
(235) 1-chloro-3-methylpentanoic acid 4'-(4''-methylcarbonyloxyphenyl)phenyl ester
(236) 1-chloro-3-methylpentanoic acid 4'-(4''-ethylcarbonyloxyphenyl)phenyl ester
(237) 1-chloro-3-methylpentanoic acid 4'-(4''-propylcarbonyloxyphenyl)phenyl ester
(238) 1-chloro-3-methylpentanoic acid 4'-(4''-butylcarbonyloxyphenyl)phenyl ester
(239) 1-chloro-3-methylpentanoic acid 4'-(4''-pentylcarbonyloxyphenyl)phenyl ester
(240) 1-chloro-3-methylpentanoic acid 4'-(4''-hexylcarbonyloxyphenyl)phenyl ester
(241) 1-chloro-3-methylpentanoic acid 4'-(4''-heptylcarbonyloxyphenyl)phenyl ester
(242) 1-chloro-3-methylpentanoic acid 4'-(4''-octylcarbonyloxyphenyl)phenyl ester
(243) 1-chloro-3-methylpentanoic acid 4'-(4''-nonylcarbonyloxyphenyl)phenyl ester
(244) 1-chloro-3-methylpentanoic acid 4'-(4''-decylcarbonyloxyphenyl)phenyl ester
(245) 1-chloro-3-methylpentanoic acid 4'-(4''-undecylcarbonyloxy-phenyl)phenyl ester
(246) 1-chloro-3-methylpentanoic acid 4'-(4''-dodecylcarbonyloxy-phenyl)phenyl ester
(247) 1-chloro-3-methylpentanoic acid 4'-(4''-tridecylcarbonyloxy-phenyl)phenyl ester
(248) 1-chloro-3-methylpentanoic acid 4'-(4''-tetradecylcarbonyloxy-phenyl)phenyl ester
(249) 1-chloro-3-methylpentanoic acid 4'-(4''-pentadecylcarbonyloxy-phenyl)phenyl ester
(250) 1-chloro-3-methylpentanoic acid 4'-(4''-hexadecylcarbonyloxy-phenyl)phenyl ester
(251) 1-chloro-3-methylpentanoic acid 4'-(4''-heptadecylcarbonyloxy-phenyl)phenyl ester
(252) 1-chloro-3-methylpentanoic acid 4'-(4''-octadecylcarbonyloxy-phenyl)phenyl ester
(253) 2-methylbutanoic acid 4'-(4''-methylcarbonyloxyphenyl)phenyl ester
(254) 2-methylbutanoic acid 4'-(4''-ethylcarbonyloxyphenyl)phenyl ester
(255) 2-methylbutanoic acid 4'-(4''-propylcarbonyloxyphenyl)phenyl ester
(256) 2-methylbutanoic acid 4'-(4''-butylcarbonyloxyphenyl)phenyl ester
(257) 2-methylbutanoic acid 4'-(4''-pentylcarbonyloxyphenyl)phenyl ester
(258) 2-methylbutanoic acid 4'-(4''-hexylcarbonyloxyphenyl)phenyl ester
(259) 2-methylbutanoic acid 4'-(4''-heptylcarbonyloxyphenyl)phenyl ester
(260) 2-methylbutanoic acid 4'-(4''-octylcarbonyloxyphenyl)phenyl ester
(261) 2-methylbutanoic acid 4'-(4''-nonylcarbonyloxyphenyl)phenyl ester
(262) 2-methylbutanoic acid 4'-(4''-decylcarbonyloxyphenyl)phenyl ester
(263) 2-methylbutanoic acid 4'-(4''-undecylcarbonyloxyphenyl)phenyl ester
(264) 2-methylbutanoic acid 4'-(4''-dodecylcarbonyloxyphenyl)phenyl ester
(265) 2-methylbutanoic acid 4'-(4''-tridecylcarbonyloxyphenyl)phenyl ester
(266) 2-methylbutanoic acid 4'-(4''-tetradecylcarbonyloxyphenyl)phenyl ester
(267) 2-methylbutanoic acid 4'-(4''-pentadecylcarbonyloxyphenyl)phenyl ester (268) 2-methylbutanoic acid 4'-(4''-hexadecylcarbonyloxyphenyl)phenyl ester
(269) 2-methylbutanoic acid 4'-(4''-heptadecylcarbonyloxyphenyl)phenyl ester
(270) 2-methylbutanoic acid 4'-(4''-octadecylcarbonyloxyphenyl)phenyl ester
(271) 3-methylpentanoic acid 4'-(4''-methylcarbonyloxyphenyl)phenyl ester
(272) 3-methylpentanoic acid 4'-(4''-ethylcarbonyloxyphenyl)phenyl ester
(273) 3-methylpentanoic acid 4'-(4''-propylcarbonyloxyphenyl)phenyl ester
(274) 3-methylpentanoic acid 4'-(4''-butylcarbonyloxyphenyl)phenyl ester
(275) 3-methylpentanoic acid 4'-(4''-pentylcarbonyloxyphenyl)phenyl ester
(276) 3-methylpentanoic acid 4'-(4''-hexylcarbonyloxyphenyl)phenyl ester
(277) 3-methylpentanoic acid 4'-(4''-heptylcarbonyloxyphenyl)phenyl ester
(278) 3-methylpentanoic acid 4'-(4''-octylcarbonyloxyphenyl)phenyl ester
(279) 3-methylpentanoic acid 4'-(4''-nonylcarbonyloxyphenyl)phenyl ester
(280) 3-methylpentanoic acid 4'-(4''-decylcarbonyloxyphenyl)phenyl ester
(281) 3-methylpentanoic acid 4'-(4''-undecylcarbonyloxyphenyl)phenyl ester
(282) 3-methylpentanoic acid 4'-(4''-dodecylcarbonyloxyphenyl)phenyl ester
(283) 3-methylpentanoic acid 4'-(4''-tridecylcarbonyloxyphenyl)phenyl ester
(284) 3-methylpentanoic acid 4'-(4''-tetradecylcarbonyloxyphenyl)phenyl ester
(285) 3-methylpentanoic acid 4'-(4''-pentadecylcarbonyloxyphenyl)phenyl ester
(286) 3-methylpentanoic acid 4'-(4''-hexadecylcarbonyloxyphenyl)phenyl ester
(287) 3-methylpentanoic acid 4'-(4''-heptadecylcarbonyloxyphenyl)phenyl ester
(288) 3-methylpentanoic acid 4'-(4''-octadecylcarbonyloxyphenyl)phenyl ester
(289) 1-chloro-2-phenylpropanoic acid 4'-(4''-methylcarbonyloxyphenyl)phenyl ester
(290) 1-chloro-2-phenylpropanoic acid 4'-(4''-ethylcarbonyloxyphenyl)phenyl ester
(291) 1-chloro-2-phenylpropanoic acid 4'-(4''-propylcarbonyloxyphenyl)phenyl ester
(292) 1-chloro-2-phenylpropanoic acid 4'-(4''-butylcarbonyloxyphenyl)phenyl ester
(293) 1-chloro-2-phenylpropanoic acid 4'-(4''-pentylcarbonyloxyphenyl)phenyl ester
(294) 1-chloro-2-phenylpropanoic acid 4'-(4''-hexylcarbonyloxyphenyl)phenyl ester
(295) 1-chloro-2-phenylpropanoic acid 4'-(4''-heptylcarbonyloxyphenyl)phenyl ester
(296) 1-chloro-2-phenylpropanoic acid 4'-(4''-octylcarbonyloxyphenyl)phenyl ester
(297) 1-chloro-2-phenylpropanoic acid 4'-(4''-nonylcarbonyloxyphenyl)phenyl ester
(298) 1-chloro-2-phenylpropanoic acid 4'-(4''-decylcarbonyloxyphenyl)phenyl ester
(299) 1-chloro-2-phenylpropanoic acid 4'-(4''-undecylcarbonyloxy-phenyl)phenyl ester
(300) 1-chloro-2-phenylpropanoic acid 4'-(4''-dodecylcarbonyloxy-phenyl)phenyl ester
(301) 1-chloro-2-phenylpropanoic acid 4'-(4''-tridecylcarbonyloxy-phenyl)phenyl ester
(302) 1-chloro-2-phenylpropanoic acid 4'-(4''-tetradecylcarbonyloxy-phenyl)phenyl ester
(303) 1-chloro-2-phenylpropanoic acid 4'-(4''-pentadecylcarbonyloxy-phenyl)phenyl ester
(304) 1-chloro-2-phenylpropanoic acid 4'-(4''-hexadecylcarbonyloxy-phenyl)phenyl ester
(305) 1-chloro-2-phenylpropanoic acid 4'-(4''-heptadecylcarbonyloxy-phenyl)phenyl ester
(306) 1-chloro-2-phenylpropanoic acid 4'-(4''-octadecylcarbonyloxy-phenyl)phenyl ester

TABLE 2

| $R_1$ | $R_3$ | Phase transition temperature (°C.) | | | | |
|---|---|---|---|---|---|---|
| | | C | S* | SC* | SA | I |
| $C_6H_{13}$ | —CH(Cl)—CH(CH$_3$)—C$_2$H$_5$<br>    *              * | ●<br>● | 36●<br>36● | 51●<br>51● | | 67●<br>67● |
| $C_7H_{15}$ | | ●<br>● | 39●<br>29● | 50●<br>50● | | 70●<br>70● |
| $C_8H_{17}$ | | ●<br>● | 63●<br>63● | 85●<br>85● | | 90●<br>90● |
| $C_9H_{19}$ | | ●<br>● | 43● | 49●<br>49● | | 73●<br>73● |
| $C_{10}H_{21}$ | | ●<br>● | 48●<br>42● | 53●<br>53● | | 80●<br>80● |
| $C_{11}H_{23}$ | | ●<br>● | | 57●<br>51● | 72●<br>71● | 75●<br>75● |
| $C_8H_{17}$ | —CH(Cl)—CH(CH$_3$)—CH$_3$<br>    * | ●<br>● | 66●<br>62● | 85●<br>85● | | 95●<br>95● |
| $C_9H_{19}$ | | ●<br>● | 68●<br>68● | 82●<br>82● | 91●<br>91● | 92●<br>92● |
| $C_{10}H_{21}$ | | ●<br>● | 66●<br>63● | 83●<br>83● | | 97●<br>96● |
| $C_{11}H_{23}$ | | ●<br>● | 80●<br>76● | | | 104●<br>103● |
| $C_8H_{17}$ | —CH(Cl)—CH$_2$—CH—CH$_3$<br>    *              \|<br>                   CH$_3$ | ●<br>● | 47● | 55●<br>55● | 68●<br>68● | 70●<br>70● |
| $C_9H_{19}$ | | ● | | 54● | 68● | 71● |

TABLE 2-continued

| R₁ | R₃ | C | S* | SC* | SA | I |
|---|---|---|---|---|---|---|
| C₁₀H₂₁ | | ● | 42● | 55● | 68● | 70● |
| | | ● | 54● | 63● | 73● | 79● |
| | | ● | 54● | 62● | 72● | 76● |
| C₁₁H₂₃ | | ● | 59● | 73● | | 88● |
| | | ● | 55● | 72● | | 87● |
| C₉H₁₉ | —CH(Cl)—CH(CH₃)—C₂H₅<br>　　　**　　　　* | ● | 43● | 48● | 67● | 72● |
| | | ● | 35● | 48● | 67● | 71● |
| C₁₀H₂₁ | | ● | 44 | 54● | | 86● |
| | | ● | 38 | 55● | | 86● |
| C₁₁H₂₃ | | ● | 52 | 65● | | 91● |
| | | ● | 50 | 68● | | 88● |
| | | | (S1) | (S2) | | |
| C₇H₁₅ | —CH(CH₃)—C₂H₅<br>　　　　* | ● | 51● | 78● | | 82● |
| | | ● | 38● | 78● | | 82● |

What we claim is:

1. A smectic liquid crystal compound of the formula wherein R' represents a C₁₋₁₈ alkyl group, R² represents a C₁₋₁₈ alkyl group or

—CH(Cl)R³
　　* wherein R³ represents a C₁₋₁₆ alkyl group and the carbon atom marked by (*) is an asymmetric carbon atom.

2. A compound according to claim 1 wherein R² represents

—CH(Cl)CH(CH₃)₂.
　*

3. A compound according to claim 1 wherein R² represents

—CH(Cl)CH(CH₃)C₂H₅.
　*　　　*

4. A compound according to claim 1 wherein R² represents

—CH(Cl)CH₂CH(CH₃)₂.
　*

5. A compound according to claim 1 wherein R² represents

—CH₂—CH(CH₃)C₂H₅.
　　　　*

* * * * *

UNITED STATES PATENT AND TRADEMARK OFFICE
CERTIFICATE OF CORRECTION

PATENT NO. : 4,831,182
DATED : MAY 16, 1989
INVENTOR(S) : RYOICHI HIGUCHI, ET AL

It is certified that error appears in the above-identified patent and that said Letters Patent is hereby corrected as shown below:

On the title page, item [30], the priority data is incorrect, it should read as follows:

-Sep. 10, 1984 [JP] Japan .................... 59/189232
 Feb. 3, 1985 [JP] Japan .................... 60/22920--

Signed and Sealed this

Twenty-first Day of November, 1989

Attest:

JEFFREY M. SAMUELS

Attesting Officer     Acting Commissioner of Patents and Trademarks